United States Patent
Parkinson

(10) Patent No.: US 8,491,237 B2
(45) Date of Patent: Jul. 23, 2013

(54) ADVANCE CARGO RESTRAINT

(75) Inventor: Stephen T. Parkinson, Suffield, CT (US)

(73) Assignee: Capewell Components Company, LLC, South Windsor, CT (US)

( * ) Notice: Subject to any disclaimer, the term of this patent is extended or adjusted under 35 U.S.C. 154(b) by 165 days.

(21) Appl. No.: 13/081,773

(22) Filed: Apr. 7, 2011

(65) Prior Publication Data

US 2011/0250033 A1 Oct. 13, 2011

Related U.S. Application Data

(60) Provisional application No. 61/342,023, filed on Apr. 8, 2010.

(51) Int. Cl.
*B60P 7/08* (2006.01)

(52) U.S. Cl.
USPC ............ 410/10; 410/12; 410/19; 410/22; 410/23; 410/97

(58) Field of Classification Search
USPC .............. 410/7, 9, 10, 11, 12, 19, 20, 21, 22, 410/23, 96, 97; 24/265 CD, 68 CT, 68 CD, 24/299–302; 248/499
See application file for complete search history.

(56) References Cited

U.S. PATENT DOCUMENTS 7,322,780 B2 * 1/2008 Hill ................................ 410/97

* cited by examiner

*Primary Examiner* — Stephen Gordon
(74) *Attorney, Agent, or Firm* — Alix, Yale & Ristas, LLP

(57) ABSTRACT

An advanced cargo restraint employs an elongated rope-like member formed of web material. The web material is manufactured from high-modulus fibers. Various connectors are attached to the elongated member. In some embodiments, a small linkage of chain is also connected directly or indirectly with the advanced cargo restraint member. The advanced cargo restraint member is adapted to substitute for heavy-duty chains employed to secure cargo.

6 Claims, 15 Drawing Sheets

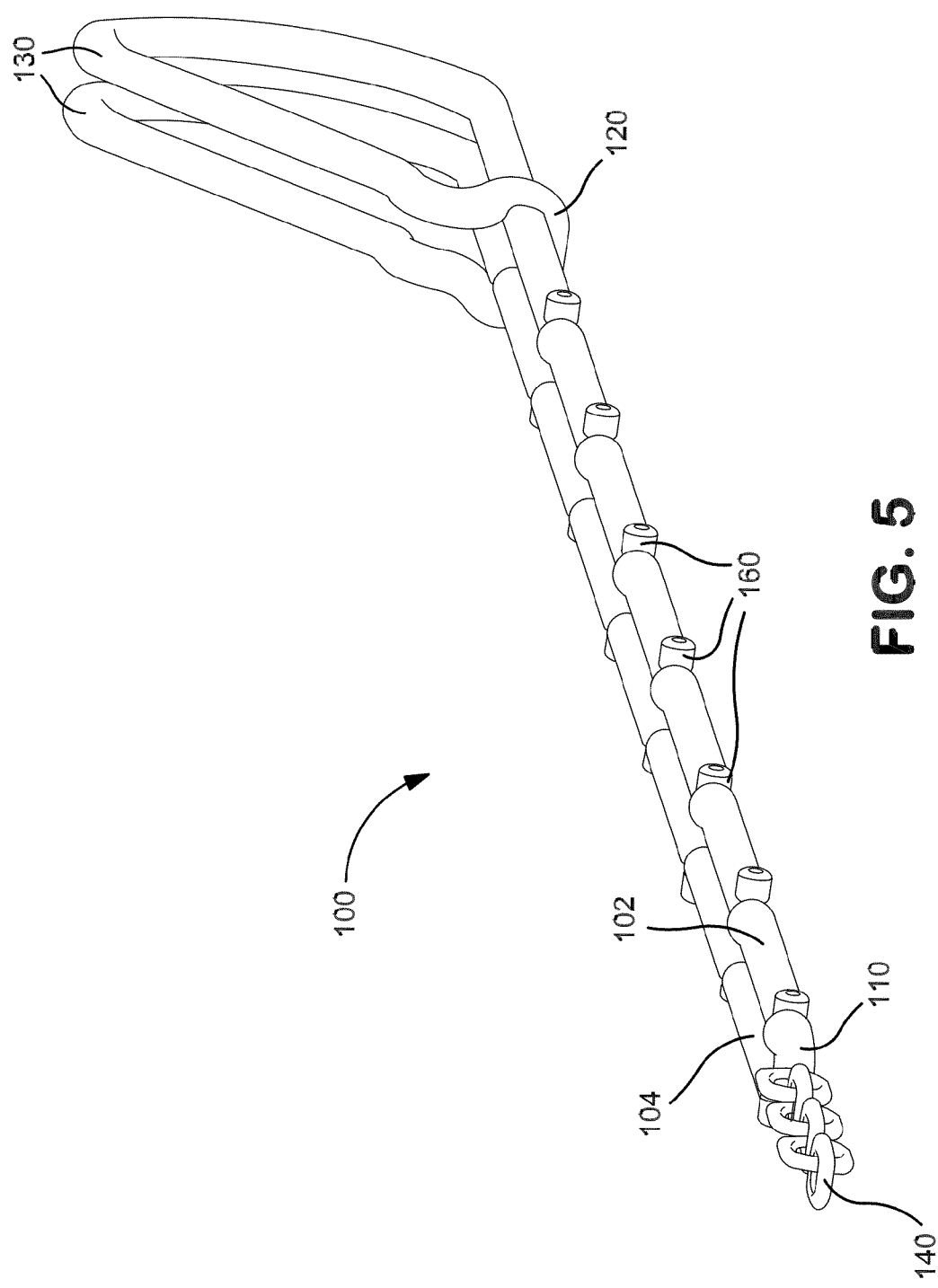

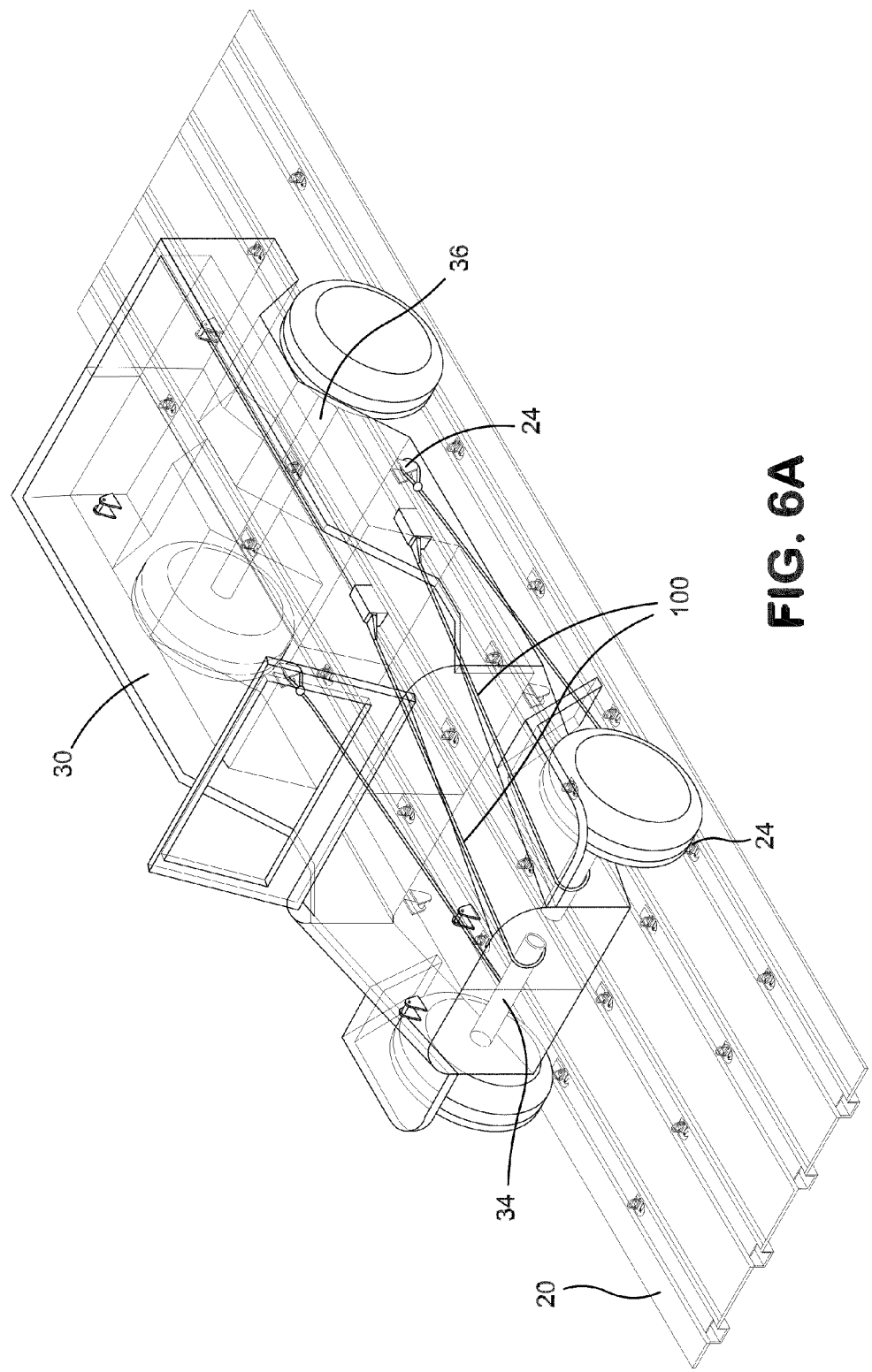

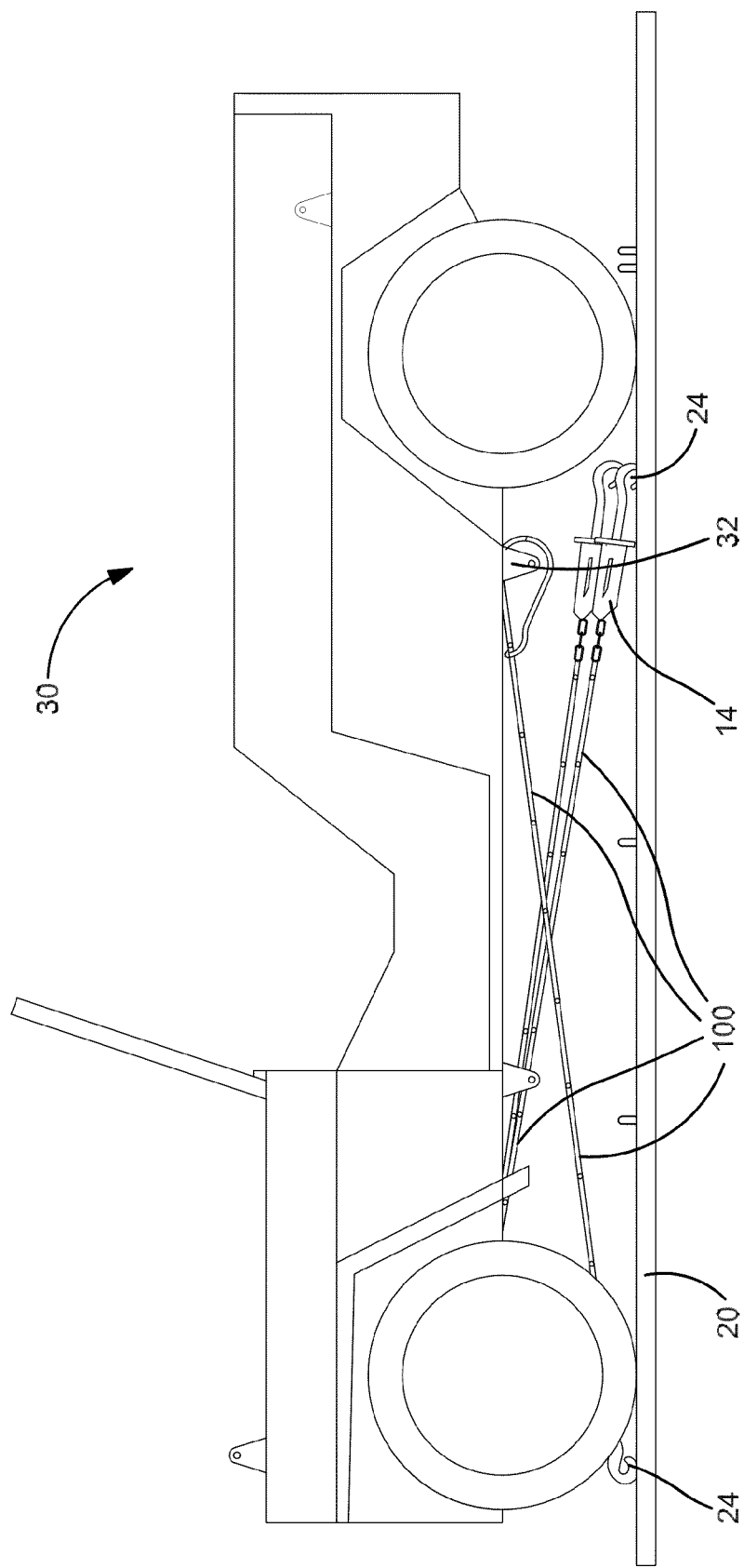

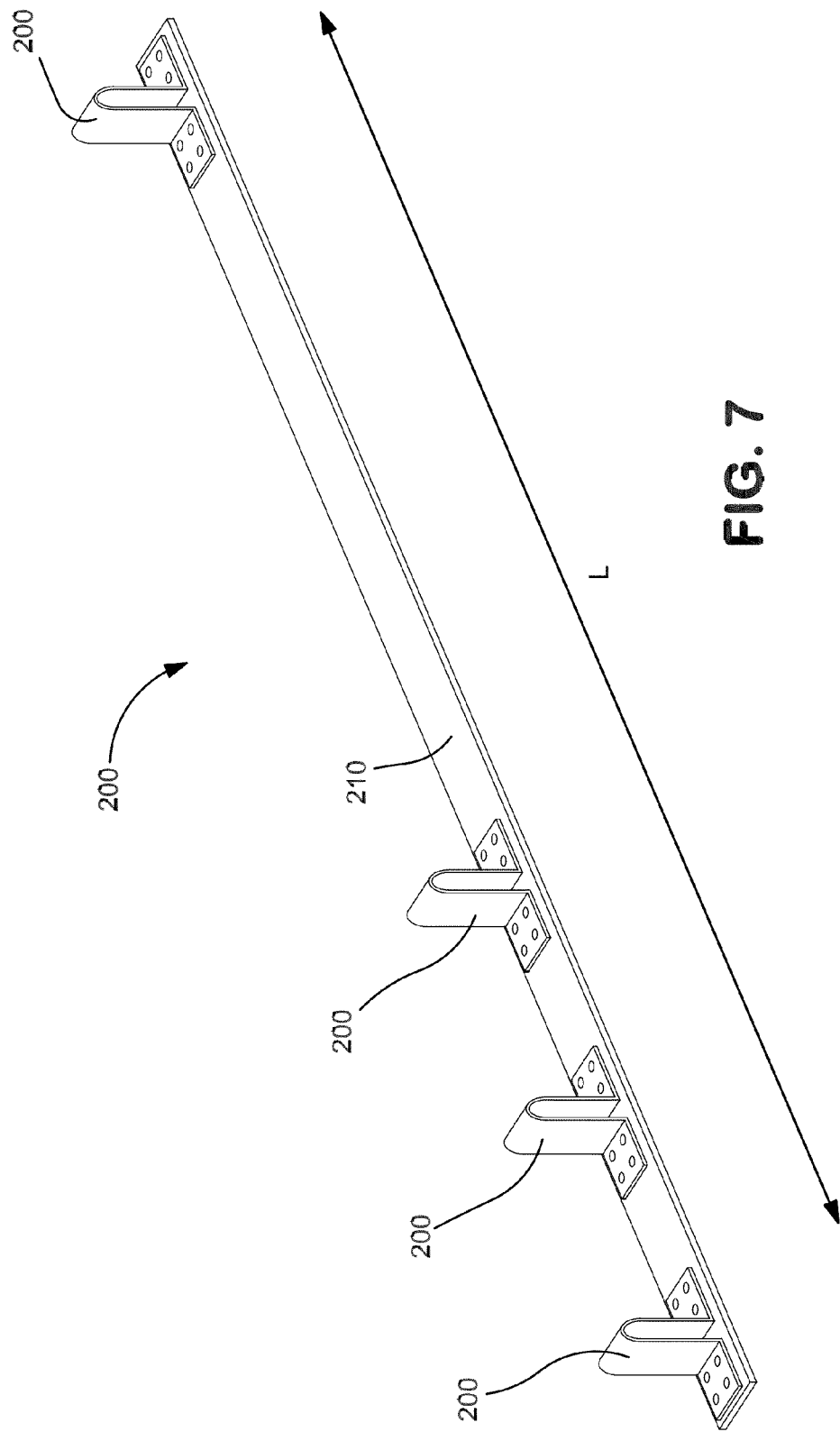

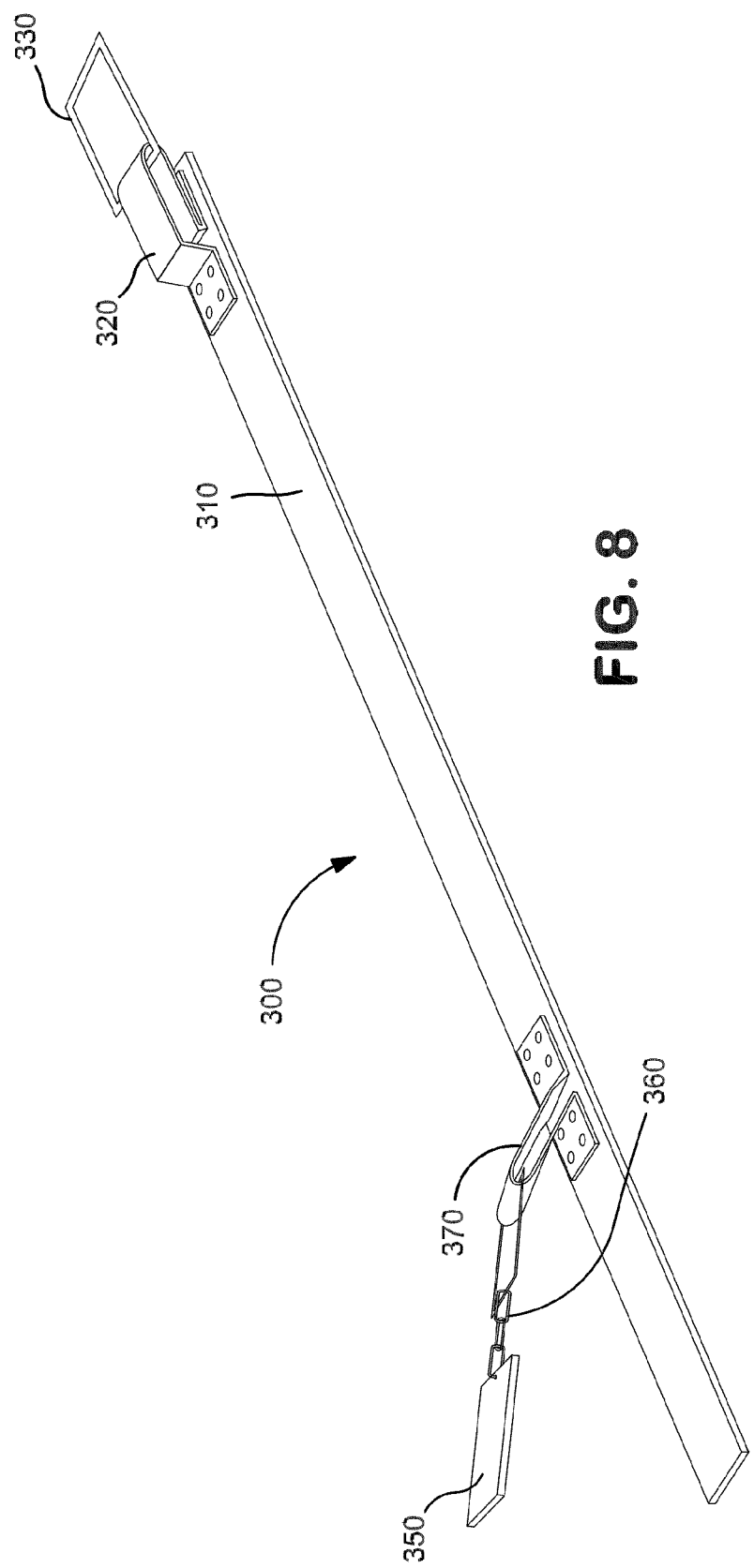

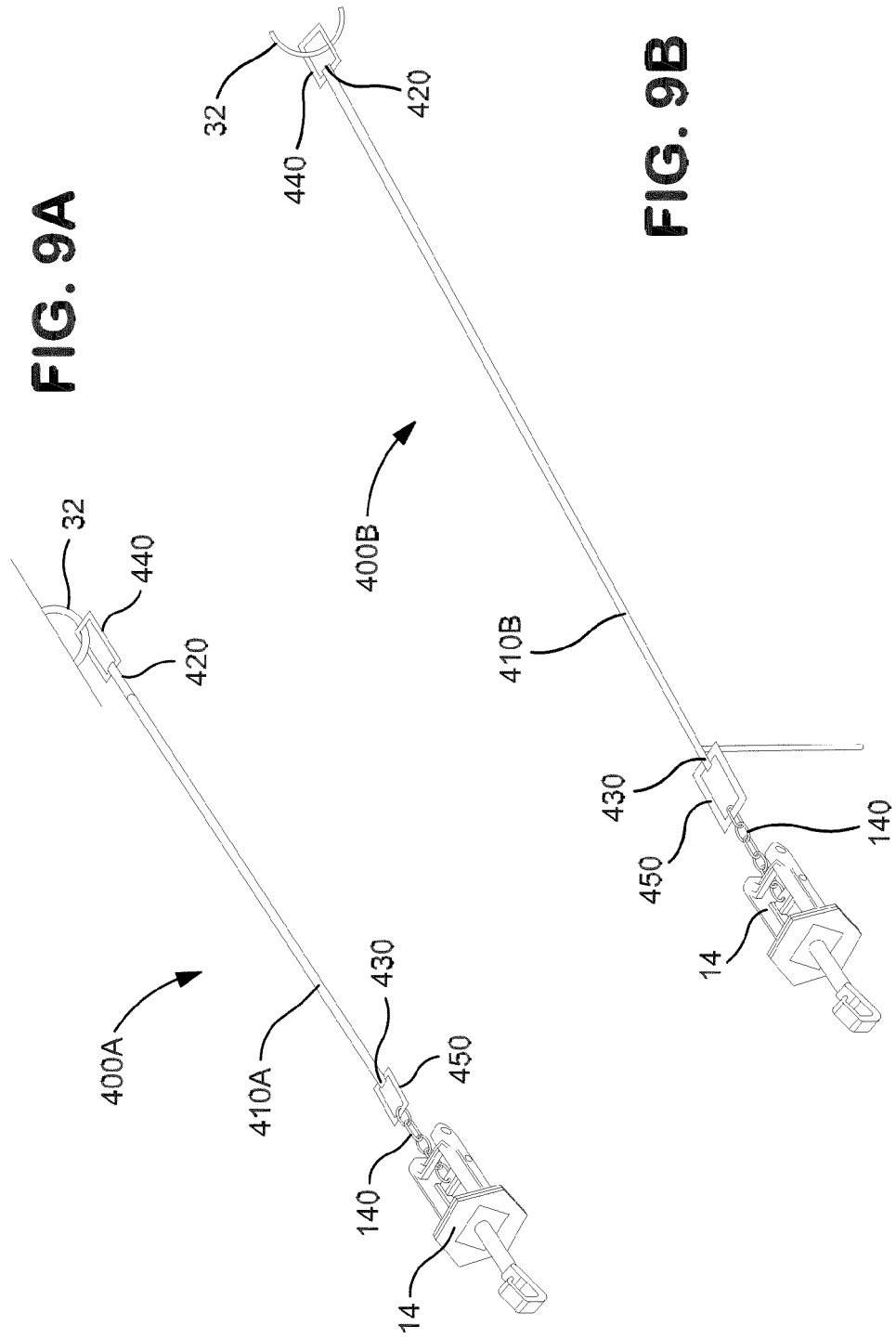

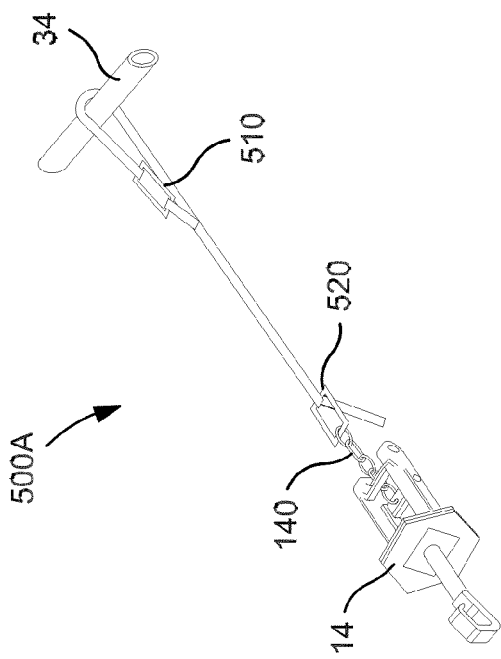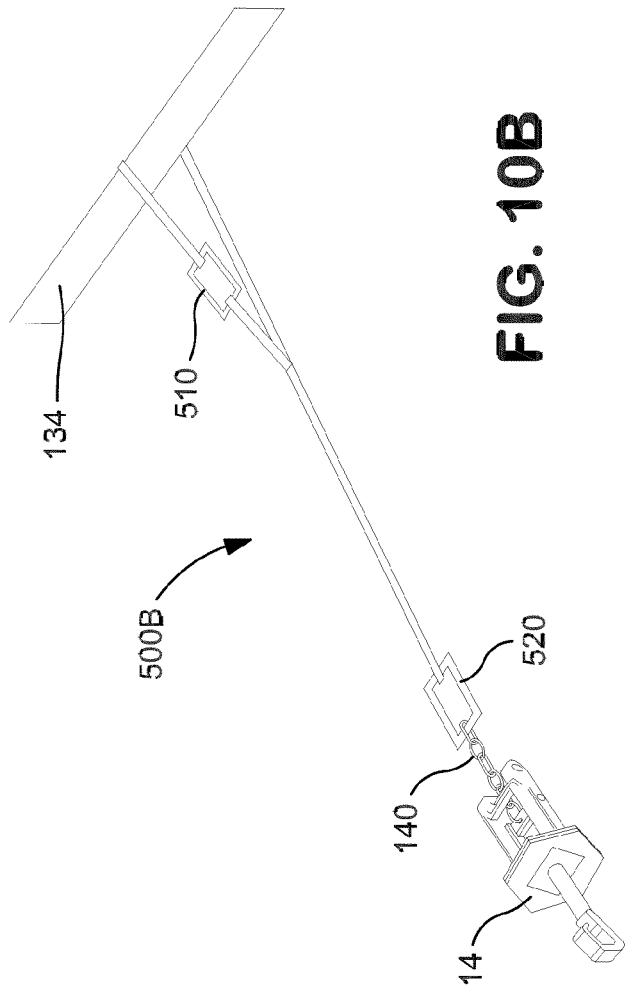

ADVANCE CARGO RESTRAINT

CROSS-REFERENCE TO RELATED APPLICATION

This application claims the priority of U.S. Provisional Patent Application No. 61/342,023 filed on Apr. 8, 2010, the entirety of which is incorporated herein by reference.

BACKGROUND

This disclosure relates generally to chains which are employed for securement purposes. More specifically, this disclosure relates to chains which are employed to stow equipment on military aircraft.

Equipment is typically stowed on military aircraft and secured by straps and chains. Ten thousand pound and twenty-five thousand pound rated chains are conventionally employed. Traditionally straps are employed for low weight storage where stretch is required and the environment is relatively clean. Chains are used to secure equipment for heavy weight storage in which stretch is disadvantageous and the environment is unclean.

A significant issue associated with the widespread use of chains is the weight and bulk of the chains since the chains are transported with the cargo on the aircraft. When employed for securement, a chain is tensioned by a purpose designed chain adjuster or tensioner. The chain tensioner connects with a hook which typically also anchors the chain to the aircraft floor. The other end of the chain connects with a hook. The hooks themselves may be relatively heavy.

Chains are conventionally employed in several manners. A single chain may be employed where the hook fastens to a vehicle tie down or around an axle and back on itself. Two or more chains may also be connected together for larger scale storage tasks.

There have been a number of proposals to address the weight issues associated with chains, especially the securement of cargo and equipment in aircraft. A prior art light weight chain assembly 50 which somewhat mimics the geometry of a conventional chain is generally illustrated in FIG. 4. Most of the length of the light weight chain 50 comprises a continuous series 60 of interconnected loops 70, including end loops 72 and 74. Each loop 70, 72 and 74 is made from a high-modulus fiber material. The opposed end loop 72 attaches to the short length of chain 40 for attachment to the chain adjuster. A mechanical hook connector 80 is fitted to the opposed end loop 74.

SUMMARY

Briefly stated, an advanced cargo restraint assembly may assume a number of forms which are adapted to replace conventional heavy-duty chains employed for securing cargo. In one form, a securement link has a high-modulus fiber composition with opposed first and second end loops. A short length of steel chain is connected to the first end loop. A toggle connector is connected to the second loop. The steel chain may attach to a chain adjuster. The first end loop may connect the steel chain by means of a larks head knot. The second end loop may also connect to the toggle connector by means of a larks head knot.

An advanced cargo restraint may comprise a low stretch, high-strength fabric having a continuous configuration with dual elongated segments and forming at a first end a first loop and at an opposing end a second loop which loops around a structure to form a double loop for securement. The restraint further comprises a plurality of cross-members extending between dual elongated segments. The second loop is securable by a connector when the structure is placed under tension by the restraint.

An advanced cargo restraint assembly may also comprise a low stretch, high-strength fabric having opposed ends. A carabiner is mounted to each end, and a chain assembly is connected to at least one carabiner.

Another advanced cargo restraint comprises an elongated web of high-modulus fabric material with a plurality of longitudinally spaced loops attached to the web.

An advanced cargo restraint assembly in another embodiment comprises an elongated flexible web of high-modulus fabric material with opposed ends. A connector is attached at one end. A sliding friction stop device is mounted to the web and longitudinally slidable therealong. A chain segment is attached to the sliding friction stop device. The sliding friction stop device may have a sleeve-like configuration. The connector may be a fixed hook. A protective material is preferably applied to the web. In one application, a chain adjuster is connected to the chain section.

In another application, an advanced cargo restraint assembly is integrated with a capstan winch comprising a rotatable drum having a lock-off mechanism. An adjustable hook extends from the capstan winch and functions as a tensioner. A lock/release mechanism locks the drum in a fixed rotational position. A restraint member comprises an elongated web of high-modulus material wound around the drum and having at a terminal end a connector. The web may be locked to the capstan winch at a selected longitudinal position. The advanced cargo restraint assembly employs a plate which frictionally engages the restraint member wound on the drum to thereby tighten the restraint member. The hook may be adjustably displaceable to variably change the position of the hook relative to the capstan winch to thereby tighten or loosen the restraint member under a load.

BRIEF DESCRIPTION OF THE DRAWINGS

FIG. 5 is an idealized perspective view of one embodiment of an advance cargo restraint;

FIG. 6A is a perspective view, portions broken away and portions in phantom, illustrating the application of advance cargo restraints to secure a vehicle to a transport aircraft floor;

FIG. 6B is a side elevational view of the vehicle, floor and advance cargo restraints in the secured state of FIG. 6A;

FIG. 7 is a perspective view, partly in schematic and partly broken away, illustrating a second embodiment of an advance cargo restraint;

FIG. 8 is a perspective view, partly in idealized form and partly in schematic view, illustrating a third embodiment of an advance cargo restraint assembly;

FIGS. 9A and 9B are each a perspective view, partly in idealized form and partly in schematic, illustrating a fourth embodiment of an advance cargo restraint assembly as attached to a vehicle lug;

FIGS. 10A and 10B are each a perspective view, partly in idealized form and partly in schematic, illustrating an advance cargo restraint assembly as attached to an axle of a vehicle or other structure;

DETAILED DESCRIPTION OF THE PREFERRED EMBODIMENTS

With reference to the drawings wherein like numerals represent like parts throughout the figures, one embodiment of an advance cargo restraint is generally designated by the numeral 100 in FIG. 5. As described below, several embodiments of an advanced cargo restraint are disclosed. Ordinarily, the advance cargo restraint has an elongated flexible quasi-rope-like principal portion which connects with various forms of connecting hardware. The FIG. 5 illustration shows an idealized rigid form for purposes of description only. As will be described below, the restraint 100 optimizes the use of high modulus textiles to minimize weight while at the same time providing the required performance and robustness for heavy duty securement functions, such as securing a vehicle to a military aircraft for transport.

Figure 1:
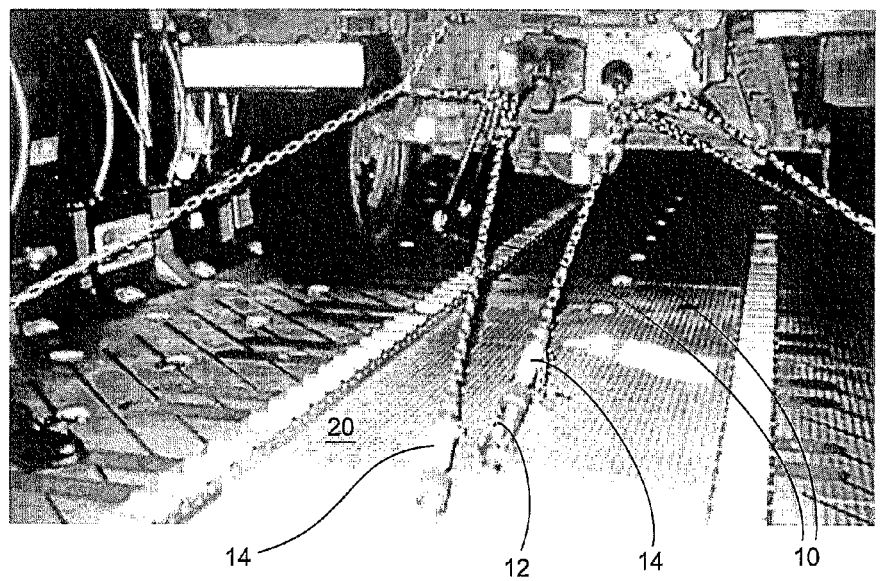
FIG. 1 is a photograph illustrating conventional steel chains with end hooks having, for example 10,000 pound and 25,000 pound rated capacity, and secured in tension with a vehicle between aircraft floor tie downs and vehicle anchor points.

The advance cargo restraint 100 and various advance cargo restraints described herein have particular suitability in connection with replacing conventional steel chains 10 with end hooks 12, as illustrated in FIG. 1. The conventional steel chains, which may have a 10,000 pound or 25,000 pound rated capacity, are connected in tension via chain tensioners 14 between aircraft floor 20 tie downs and vehicle hard anchor points.

Figure 2A:
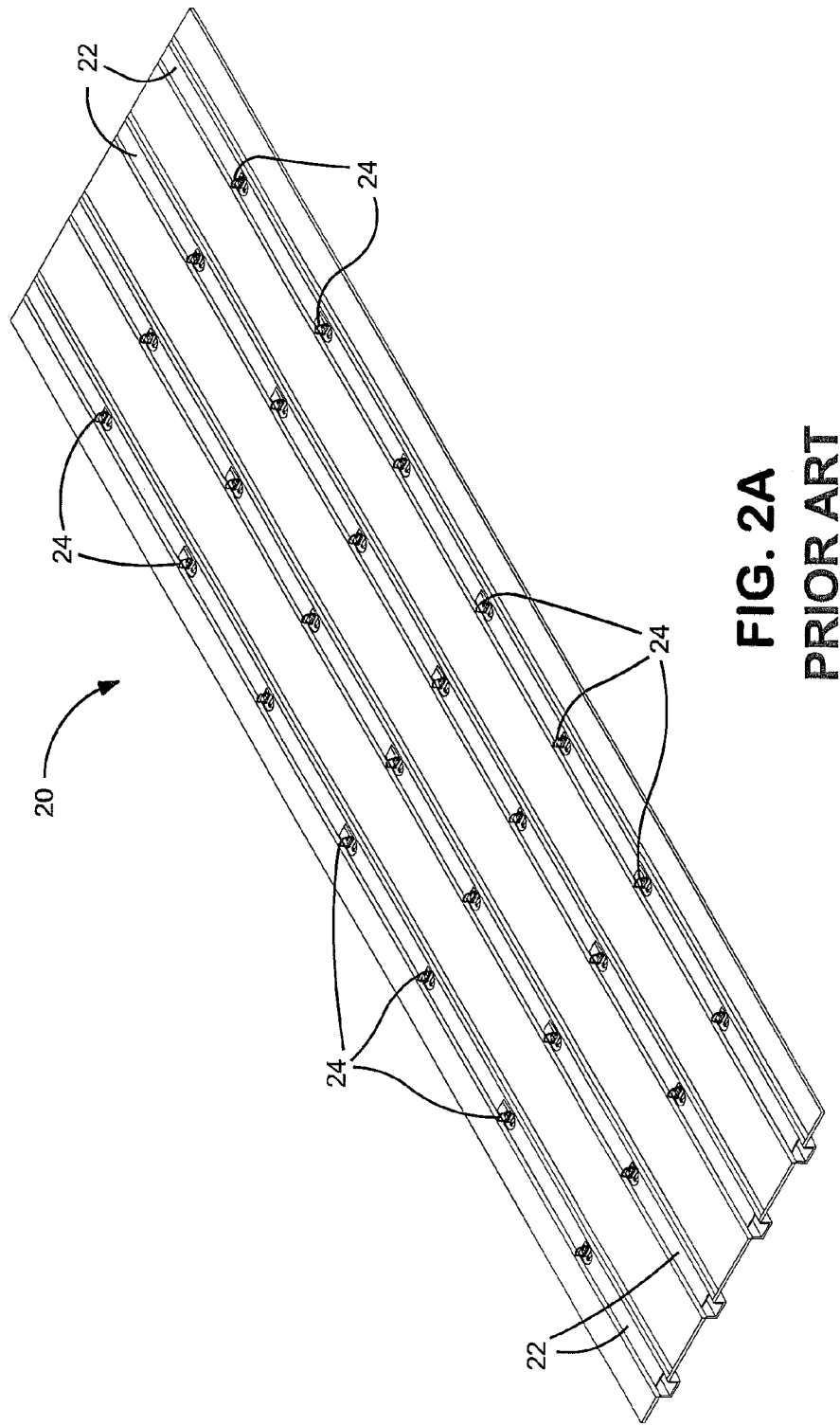
FIGS. 2A and 2B are fragmentary perspective views of a typical transport aircraft floor which is fitted with fold flat tie down rings.
Figure 2B:
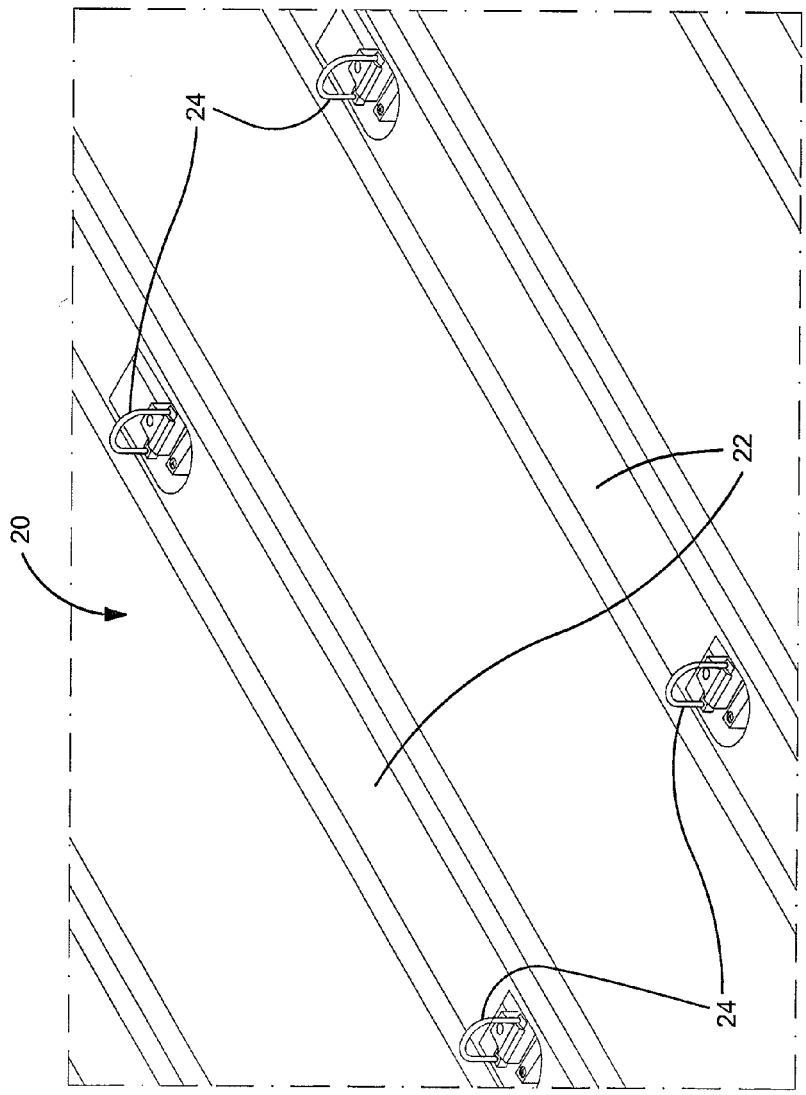
Figure 3:
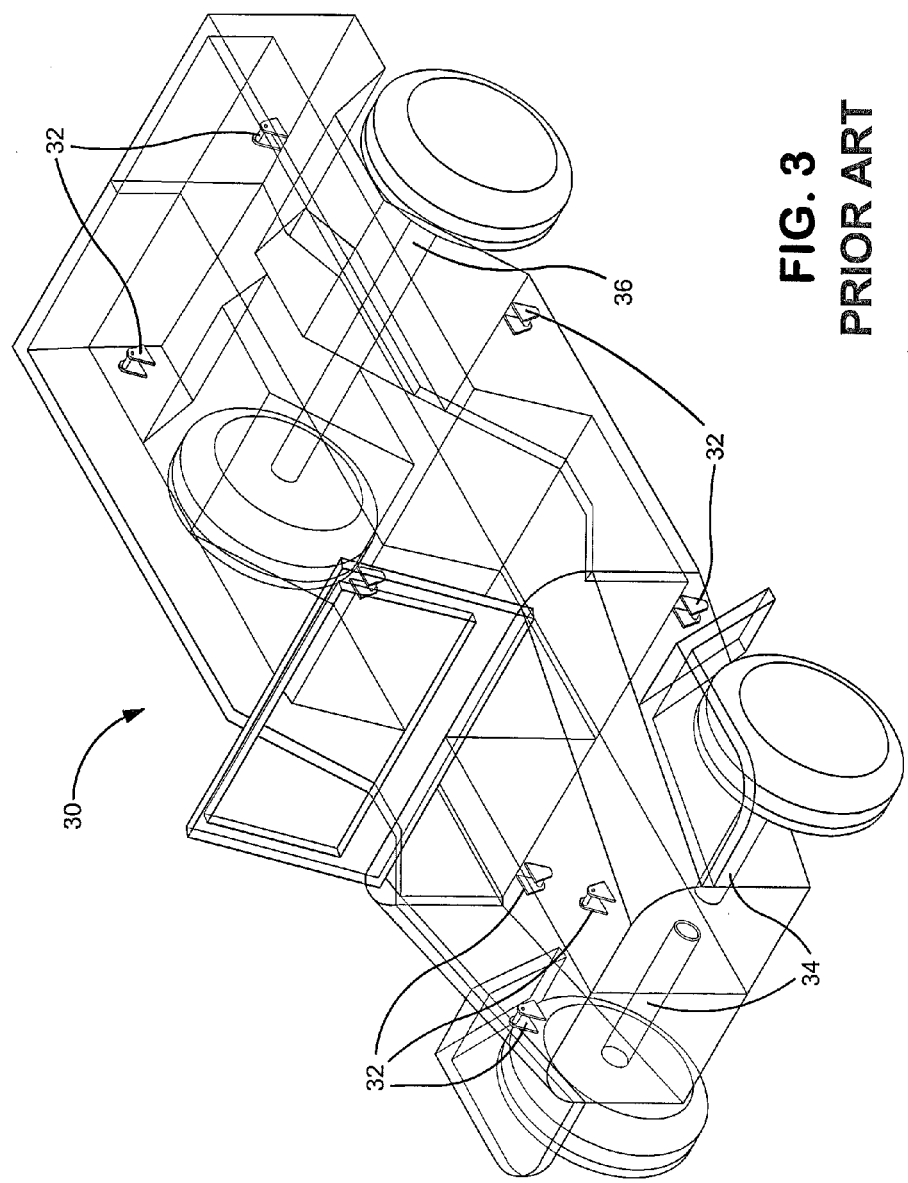
FIG. 3 is a schematic view, partly in phantom, of a military transport vehicle prominently indicating fixed specific hard anchor points.
Figure 4:
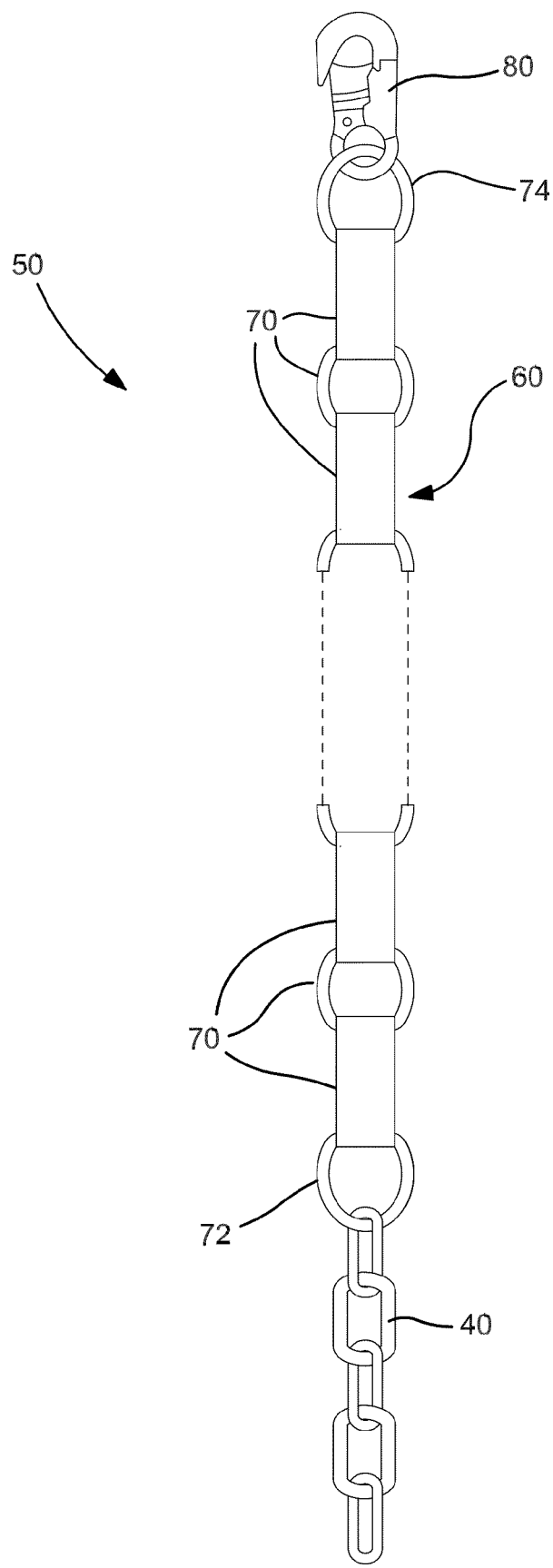
FIG. 4 is a top plan view of a prior art light weight chain, portions in serial dot form to indicate the length may vary.

A preferred application for the advance cargo restraint can be initially appreciated by reference to FIGS. 2A, 2B and 3. As best illustrated in FIGS. 2A and 2B, military airport transport aircraft have floors 20 with parallel rib-like reinforcement tracks 22. The floors 20 are typically fitted with fold flat tie down rings 24 which are mounted to the reinforcement tracks 22 of the floor. The rings 24 are typically spaced at a pitch of 20 inches by 20 inches across the aircraft floor. When not in use, the tie down rings 24 are folded flat with the top surface of the tracks.

As further illustrated in FIG. 3, the military transport vehicles 30 for which the advance cargo restraints 100 have particular applicability typically are fitted with specific or fixed hard anchoring points 32 for anchoring with heavy duty chains or the conventional heavy duty chains are wrapped around the axles 34, 36, and tensioned in place for securing the vehicle to the aircraft floor 20 (FIGS. 2A and 2B). Vehicle 30 represents numerous types of vehicles for which the advance cargo restraint 100 can be effectively used.

With reference to FIG. 5, advance cargo restraint 100 is configured in a continuous loop with elongated dual cord segments 102 and 104 which at opposed ends form loops 110 and 120. Loop 110 connects with a length of chain 140 (partially illustrated). Loop 120 is essentially formed by looping back on the opposed cord segments of the restraint (in a larks head knot) to form a compound transverse loop 130 at the opposed extreme edge of the advance cargo restraint. This loop 130 is illustrated in exaggerated idealized form as it would loop around, for example, the axle of a vehicle to be secured. A series of transverse cross webs 160 connect and bridge along the length of the cord segments 102 and 104. This structure is a complete restraint system in itself, but additionally, these cross webs 160 provide connecting structures for various hardware or connectors (not illustrated), such as carabiners, hooks, rings or other connecting devices. Other forms of connectors may also be provided.

The advance cargo restraint 100 may be constructed in a wide range of lengths in accordance with a given application. One representative length is 9 feet (108 inches). The advance cargo restraint 100 preferably connects with a steel chain segment 140 having only a few links. The chain segment 140 interfaces with an existing ratchet-type chain tensioner 14 to provide the requisite taut configuration.

As best illustrated in FIGS. 6A and 6B, the advance cargo restraint 100 is employed in a manner similar to conventional chains for securing and connecting with the hard anchor points 32 and/or wrapped around the axles 34, 36 of the vehicle 30. The advance cargo restraint 100 provides an equivalent securement force to that of the conventional chains but has significantly less weight and bulk and consequently is very advantageous since weight is a significant factor in air cargo transport. In addition, the light weight makes for easier securing of the vehicle.

With reference to FIG. 7, another embodiment of an advance cargo restraint is generally designated by the numeral 200. The advance cargo restraint is made of an elongated flexible strip of webbing of length L with a series of loops 220 stitched or otherwise affixed to one surface 210 (and/or both surfaces) of the webbing. It should be appreciated that there may be additional loops of webbing along the longitudinal extent thereof in addition to those illustrated in FIG. 7, which is intended to be schematic in form. The length L, in one embodiment, is 9 feet, but may assume numerous dimensions.

Another embodiment of an advance cargo restraint assembly is generally designated by the numeral 300 in FIG. 8. A loop 320 is shown proximate one end of an elongated web 310. A carabiner 330 is secured by the loop 320. A second carabiner 350 is secured by chain linkage 360 or rings to a second loop 370. It should be appreciated that additional loops and also carabiners may be employed. It should also be appreciated that not all loops may be illustrated in the FIG. 8 drawing.

FIGS. 9A and 9B show additional embodiments of an advance cargo restraint assembly designated by 400A and 400B. Each elongated web 410A, 410B includes loops 420, 430 which respectively connect carabiners 440, 450 at opposed ends of the web. One carabiner 440 is attached to a lug 32, for example, of a vehicle. A second carabiner 450 attaches to a relatively short length of steel chain 140 which is, in turn, preferably connected and tightened by chain tensioner 14.

FIGS. 10A and 10B show additional embodiments of an advance cargo restraint designated by 500A and 500B. A carabiner 510 is employed to complete a loop 520 around to the axle 34 of a vehicle or a connecting bar 134. The opposed end of the restraints connect with a carabiner 520 which attaches to a short length of steel chain 140. The chain 140 is received and adjusted in tension by a chain tensioner 14.

Figure 11:
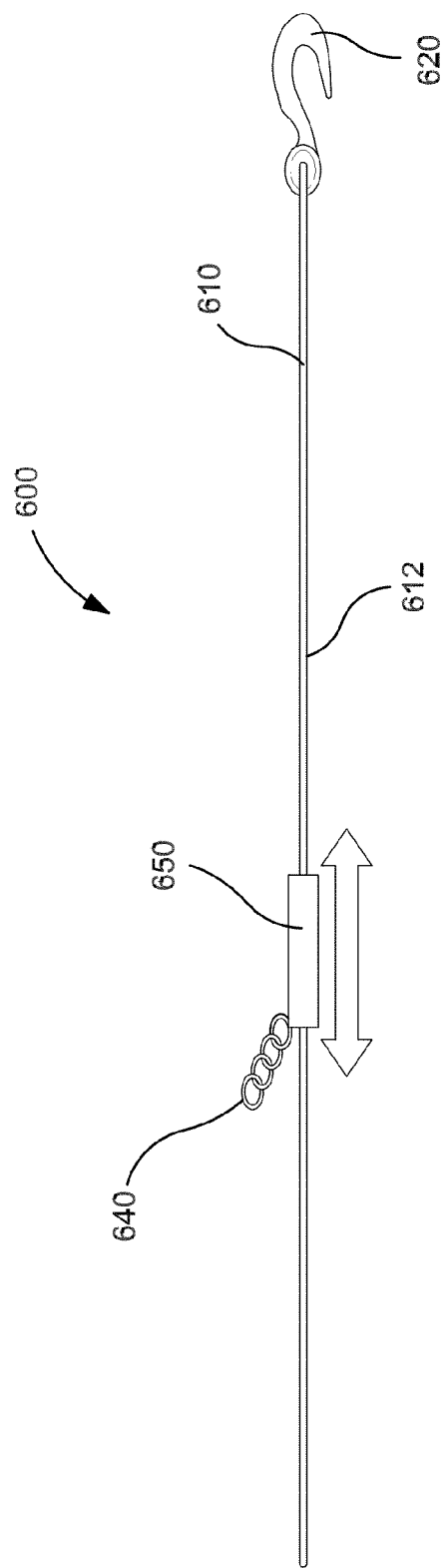
FIG. 11 is a top plan view, partly in idealized form and partly in schematic, of a fifth embodiment of an advance cargo restraint.

With reference to FIG. 11, an advanced cargo restraint 600 comprises an elongated rope-like member 610 formed of web material. A hook 620 is attached to one end of the elongated web. A sliding friction stop device 650 is slidably adjustable along the length of the web member 610. A short length of chain 640 extends from the sliding friction stop device 650 which may be longitudinally adjusted (in the general direction of the arrows). The restraint member 610 is manufactured from a high modulus fiber. It should be appreciated that the fixed hook 620 can be fastened to a hard point, or it can be looped back onto the restraint member 610. The high modulus fiber is protected from abrasives and a chemically aggressive environment by applying a polymer or a sleeve coating 612 after the web is finished or to an inner layer of the restraining member. Alternatively, the stop device 650 may also be employed in connection with a chain adjuster (not illustrated in FIG. 11).

Figure 12:
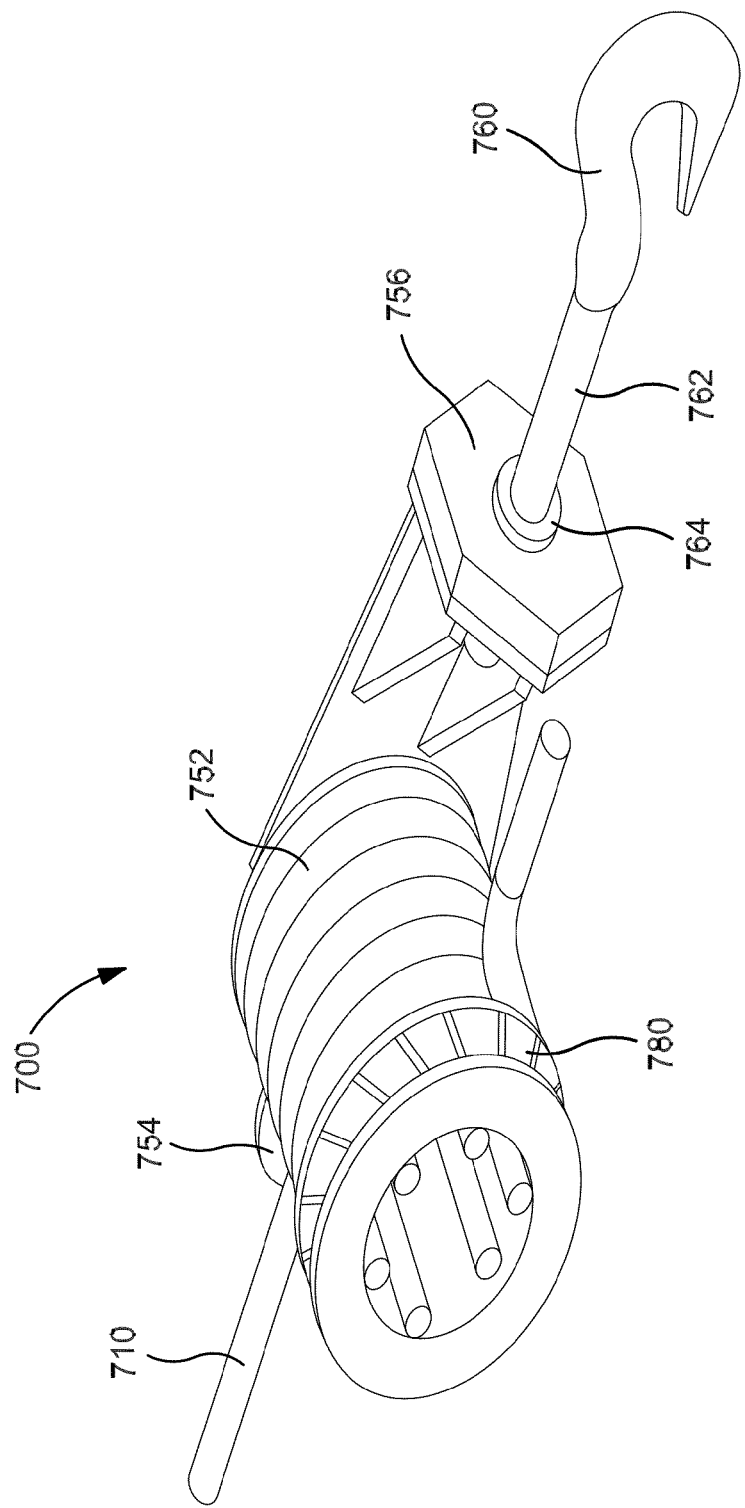
FIG. 12 is a perspective fragmentary view of an advance cargo restraint as integrated with a capstan winch assembly.
Figure 13:
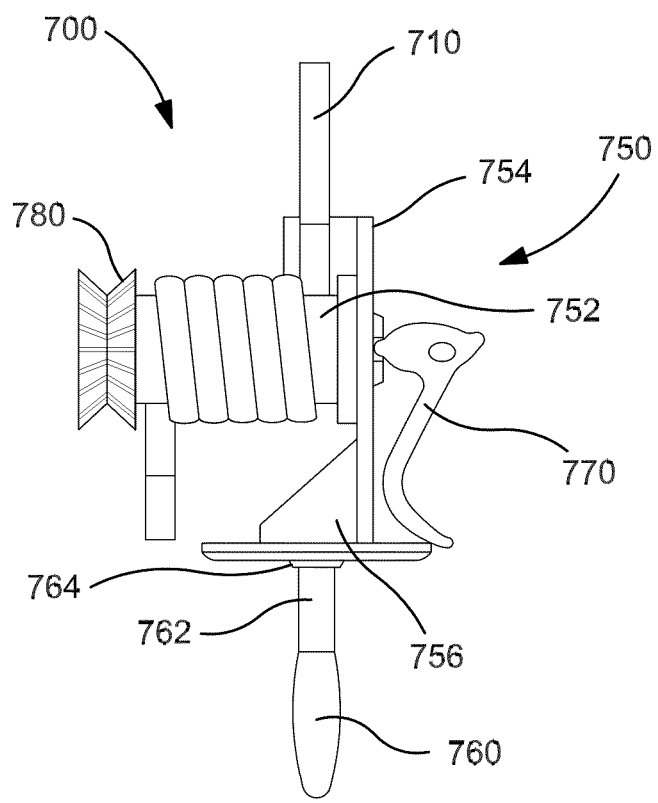
FIG. 13 is a top plan fragmentary view of the advance cargo restraint and capstan winch assembly of FIG. 12.

With reference to FIGS. 12 and 13, an advanced cargo restraint assembly 700 functions as an integrated lightweight securement assembly. A flexible elongated restraint member 710 is received in reel-like fashion in conjunction with a capstan winch 750 having a drum 752 and a cooperative restraint guide 754. An adjustable hook 760 which functions as a chain tensioner is fixedly mounted via a mounting frame 756 to the capstan winch 750. The capstan winch 750 and adjustable hook 760 function as a combined stop device and a chain adjuster.

The winch 750 can be locked by lowering a lock/release handle 770. This compresses two plates of the lock-off mechanism 780 onto the restraint member so that a friction stop against the wound restraint member 710 is cooperatively formed by the plates and the drum 752. The friction fit arrests the payout of the restraint member 710 from the drum. A hook connection 762 is threaded with an anchor nut 764 to provide a fine adjustment (tensioner) to tightening/loosening the restraint member relative to the load. Further adjustment can be obtained by pulling through the restraint member or manual rotation by the lock-off mechanism 780.

The opposite end of the restraint member 710 may be configured in a loop (not illustrated) or connect with various connectors.

Keepers (not illustrated) can be added to prevent the restraint member disengaging from the capstan drum 752 and/or sides under very intense conditions.

The advance cargo restraints 100, 200, 300, 400A, 400B, 500A, 500B, 600 and 700 employ elongated restraint members which are manufactured from high-modulus fibers, such as, for example, Kevlar® synthetic fiber, Dyneema® rope fiber, Spectra® fiber, Zylon® carbon fiber fabric and polyberzoxazole (PBD) fiber material. The fibers have favorable ultraviolet characteristics and high temperature creep resistance. A polymer coating is applied to the restraints and webbing material to provide a protective shield. The polymer coating provides abrasion and chemical resistance.

It will be appreciated that the foregoing advance cargo restraints 100, 200, 300, 400A, 400B, 500A, 500B, 600 and 700 provide a technical solution to the weight problem inherent in metal chain securement to make possible an effective light weight chain-type securement system which is especially adaptable for military aircraft. The loop flexibility in comparison to the conventional rigid steel chain links provides additional storage benefits. The restraints are compatable with existing vehicle provisions, existing tensioners and existing practice. The restraints are adapted for use with chain links to maintain compatability with chain tensioners. Connectivity is accomplished by mechanical links, built-in loops and flexibility of the fibers.

What is claimed:

1. An advance cargo restraint comprising:
a low stretch, high strength fabric having a continuous configuration having dual elongated segments and forming at a first end a first loop and at an opposing end a second loop which loops around a structure to form a double loop for securement and further comprising a plurality of cross-members extending between said dual elongated segments, said second loop being securable by a connector when said structure is placed under tension by said restraint.

2. The advance cargo restraint of claim 1 further comprising a length of steel chain connected to the first loop.

3. The advance cargo restraint of claim 2 and further comprising a ratchet-type chain tensioner interfacing with said length of chain.

4. The advance cargo restraint of claim 1 wherein said fabric is manufactured from material selected from the group consisting of Kevlar® synthetic fiber, Dyneema® rope fiber, Spectra® fiber, Zylon® carbon fiber fabric and polyberzoxazole fiber material.

5. The advance cargo restraint of claim 4 further comprising a protective coating applied to the fabric.

6. The advance cargo restraint of claim 5 wherein said protective coating is a polymer coating.

* * * * *